(12) United States Patent
Takahashi et al.

(10) Patent No.: US 8,376,635 B2
(45) Date of Patent: Feb. 19, 2013

(54) FOCAL PLANE SHUTTER AND OPTICAL DEVICE USING SAME

(75) Inventors: Hiroshi Takahashi, Chiba (JP); Yoichi Nakano, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 13/421,095

(22) Filed: Mar. 15, 2012

(65) Prior Publication Data

US 2012/0177359 A1 Jul. 12, 2012

Related U.S. Application Data

(63) Continuation of application No. PCT/JP2011/054078, filed on Feb. 24, 2011.

(30) Foreign Application Priority Data

Jun. 23, 2010 (JP) ................................. 2010-143184

(51) Int. Cl.
G03B 9/10 (2006.01)
(52) U.S. Cl. ........................................ 396/443; 396/456
(58) Field of Classification Search .................. 396/443, 396/453, 456
See application file for complete search history.

(56) References Cited

U.S. PATENT DOCUMENTS

| 4,975,722 A * | 12/1990 | Suzuki et al. ................. 396/456 |
| 8,197,150 B2 * | 6/2012 | Yamaguchi et al. .......... 396/453 |
| 2012/0177359 A1 * | 7/2012 | Takahashi et al. ............ 396/456 |

FOREIGN PATENT DOCUMENTS

| JP | 58-196527 | 11/1983 |
| JP | 2001-21947 | 1/2001 |
| JP | 2003-107557 A1 | 4/2003 |
| JP | 3913873 B2 | 5/2007 |
| JP | 2009-31513 A1 | 2/2009 |

OTHER PUBLICATIONS

International Search Report for International Application No. PCT/JP2011/054078 dated May 31, 2011.

* cited by examiner

*Primary Examiner* — William B. Perkey
(74) *Attorney, Agent, or Firm* — Kratz, Quintos & Hanson, LLP

(57) ABSTRACT

A focal plane shutter includes: a board including an opening; blades capable of opening and closing the opening; a drive member movable between a start position and a terminal position, biased toward the terminal position, and driving the blades; a brake member supported to abut and move away from the drive member positioned at the terminal position, and biased to abut the drive member positioned at the terminal position; and a set member rotatable in only one direction, and moving the drive member from the terminal position to the start position; wherein the set member includes a drive portion abutting the brake member to move the brake member away from the drive member and then abutting the drive member to move the drive member toward the start position.

5 Claims, 11 Drawing Sheets

FOCAL PLANE SHUTTER AND OPTICAL DEVICE USING SAME

CROSS-REFERENCE TO RELATED APPLICATION

This application is a continuation of and claims priority to International Patent Application No. PCT/JP2011/054078 filed on Feb. 24, 2011, which claims priority to Japanese Patent Application No. 2010-143184 filed on Jun. 23, 2010, subject matter of these patent documents is incorporated by reference herein in its entirety.

BACKGROUND (i) Technical Field

The present invention relates to focal plane shutters and optical device using same.

(ii) Related Art

A focal plane shutter is equipped with a set member for moving a drive member, which drives blades, from a terminal position to a start position (see Japanese Unexamined Patent Application Publication No. 2009-31513). Also, there is a focal plane shutter equipped with a brake member in light of prevention of bounding of the drive member (see Japanese Unexamined Patent Application Publication No. 2001-21947). The brake member has a function to prevent the drive member moved from the start position to the terminal position from bounding at the terminal position by the abutment of the brake member with the drive member.

The drive member is moved to the start position after the brake member is moved away from the drive member, whereby the movement of the drive member from the terminal position to the start position is performed. The set member is provided with a portion for abutting and moving the brake member away from the drive member and a portion for abutting and moving the drive member to the start position, and the portions are separately provided. Thus, a structure of the set member is complicated and increased in size, and the focal plane shutter is also increased in size.

SUMMARY

It is therefore an object of the present invention to provide a focal plane shutter and an optical apparatus with a reduced size.

According to an aspect of the present invention, there is provided a focal plane shutter including: a board including an opening; blades capable of opening and closing the opening; a drive member movable between a start position and a terminal position, biased toward the terminal position, and driving the blades; a brake member supported to abut and move away from the drive member positioned at the terminal position, and biased to abut the drive member positioned at the terminal position; and a set member rotatable in only one direction, and moving the drive member from the terminal position to the start position; wherein the set member includes a drive portion abutting the brake member to move the brake member away from the drive member and then abutting the drive member to move the drive member toward the start position.

DETAILED DESCRIPTION

Figure 1:
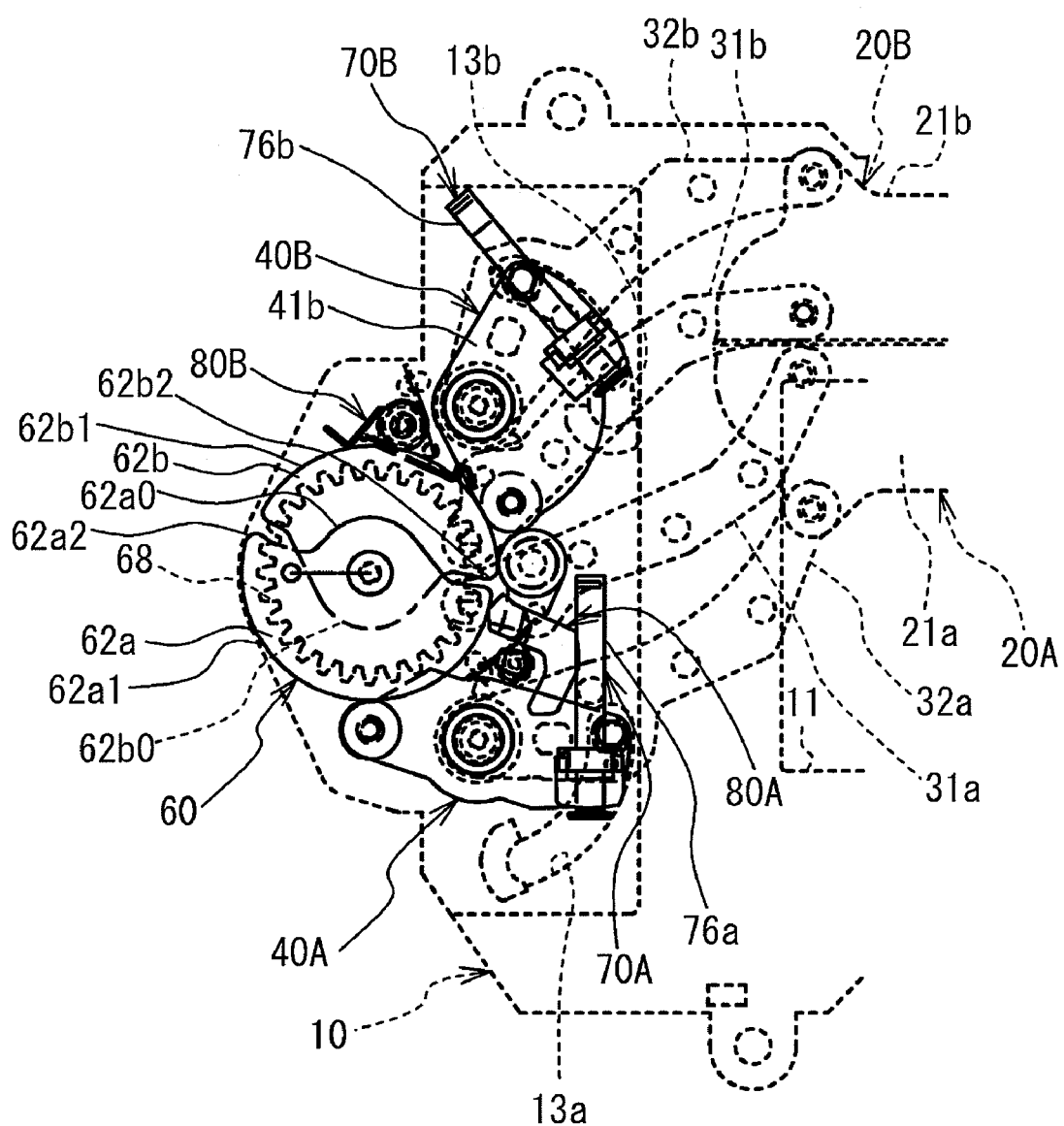
FIG. 1 is a front view of a focal plane shutter according to the present embodiment.
Figure 2:
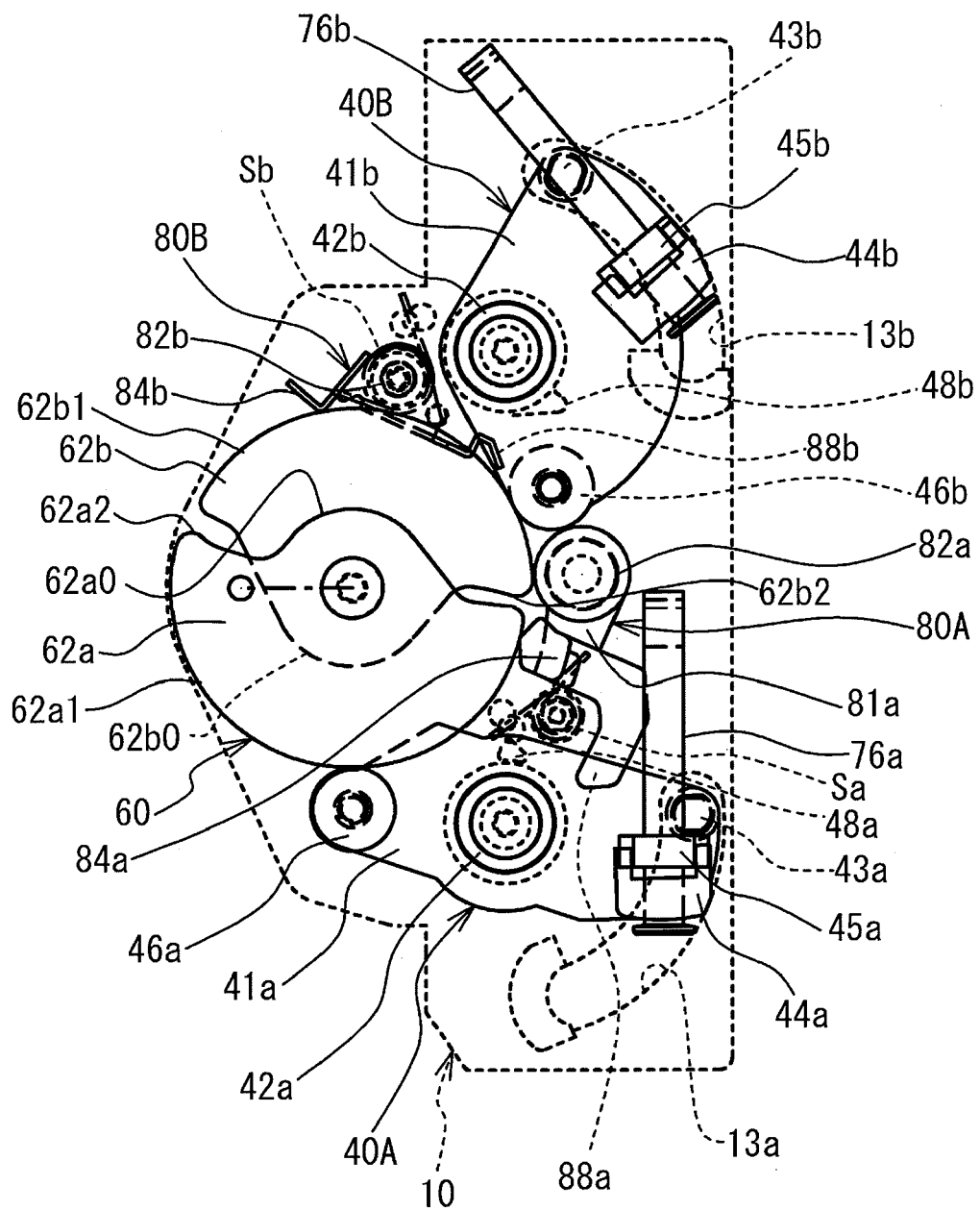
FIG. 2 is a schematic view of the focal plane shutter.
Figure 3:
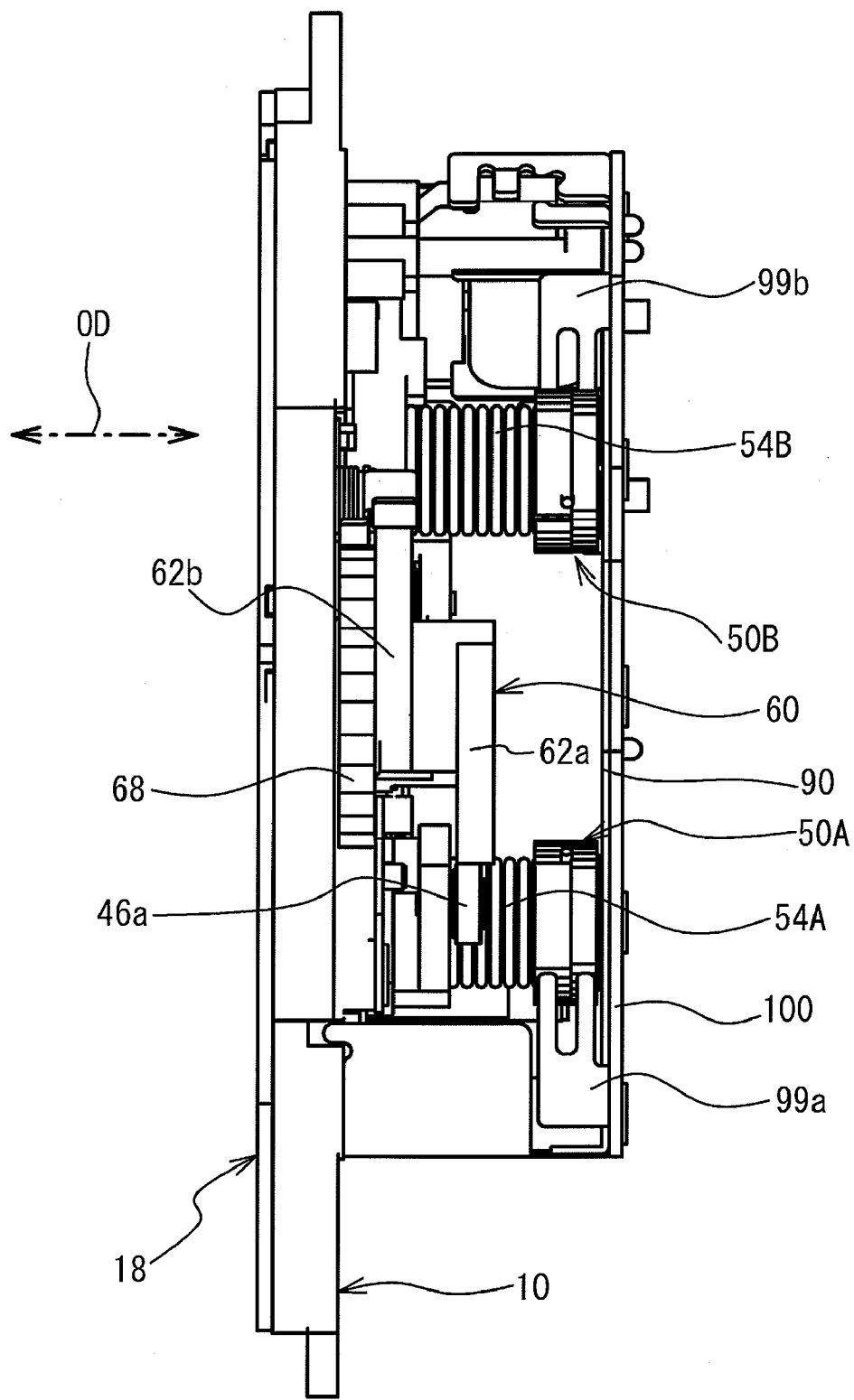
FIG. 3 is a side view of the focal plane shutter.

An embodiment will be described later with reference to the drawings. In the present embodiment, a focal plane shutter will be described. FIG. 1 is a front view of the focal plane shutter according to the present embodiment. FIG. 2 is a schematic view of the focal plane shutter. The configuration is partially omitted in FIG. 2. Further, the components without reference numeral illustrated in FIG. 1 are represented with reference numerals in FIG. 2. FIG. 3 is a side view of the focal plane shutter.

As illustrated in FIG. 1, the focal plane shutter includes: a board 10; leading blades 20A; trailing blades 20B; drive arms 31a, 32a, 31b, and 32b; a drive lever 40A; a drive lever 40B; an electromagnet 70A; and an electromagnet 70B. The board 10 is made of a synthetic resin and has an opening 11 with a rectangular shape.

Each of the leading blades 20A and the trailing blades 20B are composed of plural blades, and only blades 21a and 21b are illustrated in FIG. 1. Each blade is made of a synthetic resin and is formed into a thin shape. The leading blades 20A are coupled to the drive arms 31a and 32a. The trailing blades 20B are coupled to the drive arms 31b and 32b. Each of the drive arms 31a, 32a, 31b, and 32b is made of a metal thin plate. Each of the drive arms 31a, 32a, 31b, and 32b are swingably supported by the board 10.

Each of the leading blades 20A and the trailing blades 20B are movable between a position to recede from the opening 11 and a position to close the opening 11. Further, the plural blades configuring each blades are overlapped with one another at the position to recede from the opening 11, and are expanded at the position to close the opening 11. The leading blades 20A are expanded to close the opening 11, and the trailing blades 20B recede from the opening 11 in FIG. 1. FIG. 1 illustrates an initial state where each of the leading blades 20A and the trailing blades 20B are positioned at a start position of the movable range in an initial state, as will be described later in detail.

The board 10 is provided with the drive lever 40A and the drive lever 40B for respectively driving the drive arms 32a and 32b. The drive lever 40A and the drive lever 40B are supported for rotation about spindles provided in the board 10. As illustrated in FIG. 2, the drive lever 40A is provided with a drive pin 43a fitting into the drive arm 32a, and the drive lever 40B is provided with a drive pin 43b fitting into the drive arm 32b. The board 10 is formed with escape slots 13a and 13b each having a circular shape. The drive pins 43a and 43b move within the escape slots 13a and 13b, respectively. Therefore, the movable ranges of the drive lever 40A and the drive lever 40B are defined. Additionally, the terminal portions of the escape slots 13a and 13b are provided with rubbers for prevention of the bound. The drive lever 40A and the drive lever 40B are made of synthetic resins.

The drive lever 40A swings to swing the drive arms 31a and 32a, thereby moving the leading blades 20A. The drive lever 40A is a leading-blades drive member. Likewise, the drive lever 40B swings and the drive arms 31b and 32b swing, thereby moving the trailing blades 20B. The drive lever 40B is a trailing-blades drive member.

Next, the drive lever 40A and the drive lever 40B will be described. As illustrated in FIG. 2, the drive lever 40A includes: a base portion 41a formed into a substantially flat plate shape; a tube portion 42a standing on the base portion 41a; a roller 46a rotatably supported by the base portion 41a; and a supporting wall 44a holding an iron piece 45a. The iron piece 45a is secured on an end of a pin penetrating through the supporting wall 44a. The drive lever 40B is configured in the same way. The drive lever 40A is swingable between a position where the iron piece 45a abuts the electromagnet 70A and a position where the iron piece 45a recedes from the electromagnet 70A. The drive lever 40B is configured in the same way.

Further, the drive lever 40A is biased from the start position to the terminal position of its movable range by a spring 54A illustrated in FIG. 3. The start position is a position where the drive lever 40A abuts the electromagnet 70A. The terminal position is a position where the drive lever 40A recedes from the electromagnet 70A. In other words, the drive lever 40A is biased by the spring 54A in such a direction to move away from the electromagnet 70A. Likewise, the drive lever 40B is biased from the start position to the terminal position of its movable range by a spring 54B. The springs 54A and 54B are respectively wound around the outer circumferential sides of the tube portions 42a and 42b.

One end of the spring 54A engages the drive lever 40A, and the other end of the spring 54A engages a ratchet wheel 50A. The ratchet wheel 50A is rotatably coupled to an upper end side of the tube portion 42a as illustrated in FIG. 3, although not illustrated in FIGS. 1 and 2. The rotational amount of the ratchet wheel 50A is adjusted, thereby adjusting the biasing force of the spring 54A. A ratchet wheel 50B and a spring 54B have the same functions.

In FIG. 3, pawl portions 99a and 99b are provided for stopping the rotations of the ratchet wheels 50A and 50B, respectively. The pawl portions 99a and 99b are integrally provided in a holding plate 90 arranged to face the board 10. The holding plate 90 is made of a metal elastically deformable. A printed circuit board 100 is secured on an upper surface side of the holding plate 90. The printed circuit board 100 is provided for controlling the energization of the electromagnets 70A and 70B.

The electromagnet 70A is energized to adsorb the iron piece 45a of the drive lever 40A. Likewise, the electromagnet 70B is energized to adsorb an iron piece 45b of the drive lever 40B.

The electromagnet 70A includes: an iron core 76a; and a coil wound around the iron core 76a and exciting the iron core 76a. The coil is omitted in FIGS. 1 and 2. The coil is electrically connected to a pattern of the printed circuit board 100. In response to a switch in the energization of the coil, the iron core 76a is excited or degaussed. This configuration is also applicable to the electromagnet 70B.

A set member 60 receives a rotational force from a gear not illustrated, thereby rotating in one direction. The set member 60 positions the drive lever 40A and the drive lever 40B at the start positions. The set member 60 abuts the brake members 80A and 80B. The set member 60 includes drive cams 62a and 62b, and a gear portion 68, as illustrated in FIGS. 1 and 3. As illustrated in FIG. 3, the drive cams 62a and 62b, and the gear portion 68 are arranged in the optical axis direction OD. In other words, the drive cams 62a and 62b, and the gear portion 68 are different from one another in height in the optical axis direction OD. The gear portion 68 meshes a gear not illustrated to be rotated in one direction. The drive cam 62a includes a projection surface 62a1 along a circumference about the rotational center of the set member 60; a receding surface 62a0 recede to the inside of the circumference; and an operation surface 62a2 arranged between the projection surface 62a1 and the receding surface 62a0. The projection surface 62a1 projects radially outward from the rotational center of the set member 60. The receding surface 62a0 recedes radially inward as compared with the projection surface 62a1. In the drive cam 62a, the projection surface 62a1 and the operation surface 62a2 are capable of abutting the roller 46a.

Likewise, the drive cam 62b includes a projection surface 62b1 along a circumference about the rotational center of the set member 60; a receding surface 62b0 recede to the inside of the circumference; and an operation surface 62b2 arranged between the projection surface 62b1 and the receding surface 62b0. The projection surface 62b1 projects radially outward from the rotational center of the set member 60. The receding surface 62b0 recedes radially inward as compared with the projection surface 62b1. In the drive cam 62b, the projection surface 62b1 and the operation surface 62b2 are capable of abutting the roller 46b. As illustrated in FIGS. 1 and 2, the drive cams 62a and 62b as drive portions are each formed into a substantially fan shape. In response to the rotation of the set member 60, the drive cams 62a and 62b abut and move away from the rollers 46a and 46b, respectively. The rollers 46a and 46b are provided at such positions as to correspond to the heights of the drive cams 62a and 62b in the optical axis direction, respectively. The center of the swinging of the brake member 80A and the center of the swinging of the drive lever 40A are arranged in the rotational direction of the set member 60. The brake member 80B and the drive lever 40B are configured in the same way.

As illustrated in FIG. 2, the board 10 supports the brake members 80A and 80B for swinging. The brake member 80A includes: a arm portion 81a; a tube portion 82a provided in the arm portion 81a; a pushed portion 84a pushed by the drive cam 62a; and an abutted portion 88a abuttable with the drive lever 40A. The tube portion 82a slidably fits onto a spindle provided in the board 10. The brake member 80A is biased to be rotated clockwise by a spring Sa secured on the board 10. The spring Sa is wound around a spindle provided in the board 10, its one end engages the brake member 80A, and the other end is secured on the board 10.

The base portion 41a is provided at its bottom side with an abutting portion 48a. The abutting portion 48a is abuttable with the abutted portion 88a of the brake member 80A. Specifically, the abutting portion 48a abuts the abutted portion 88a when the drive lever 40A is positioned at the terminal position.

Additionally, the brake member 80B includes: a tube portion 82b; a pushed portion 84b pushed by the drive cam 62b; and an abutted portion 88b abuttable with the drive lever 40B. The tube portion 82b slidably fits onto a spindle provided in the board 10. The brake member 80B is biased to be rotated counterclockwise by a spring Sb secured on the board 10. This will be described later in detail. The tube portion 42b of the drive lever 40B is provided at its circumferential portion with an abutting portion 48b. The abutting portion 48b projects outward from the circumferential portion of the tube portion 42b. The abutting portion 48b is abuttable with the abutted portion 88b of the brake member 80B. Specifically, the abutting portion 48b abuts the abutted portion 88b when the drive lever 40B is positioned at the terminal position.

Figure 4:
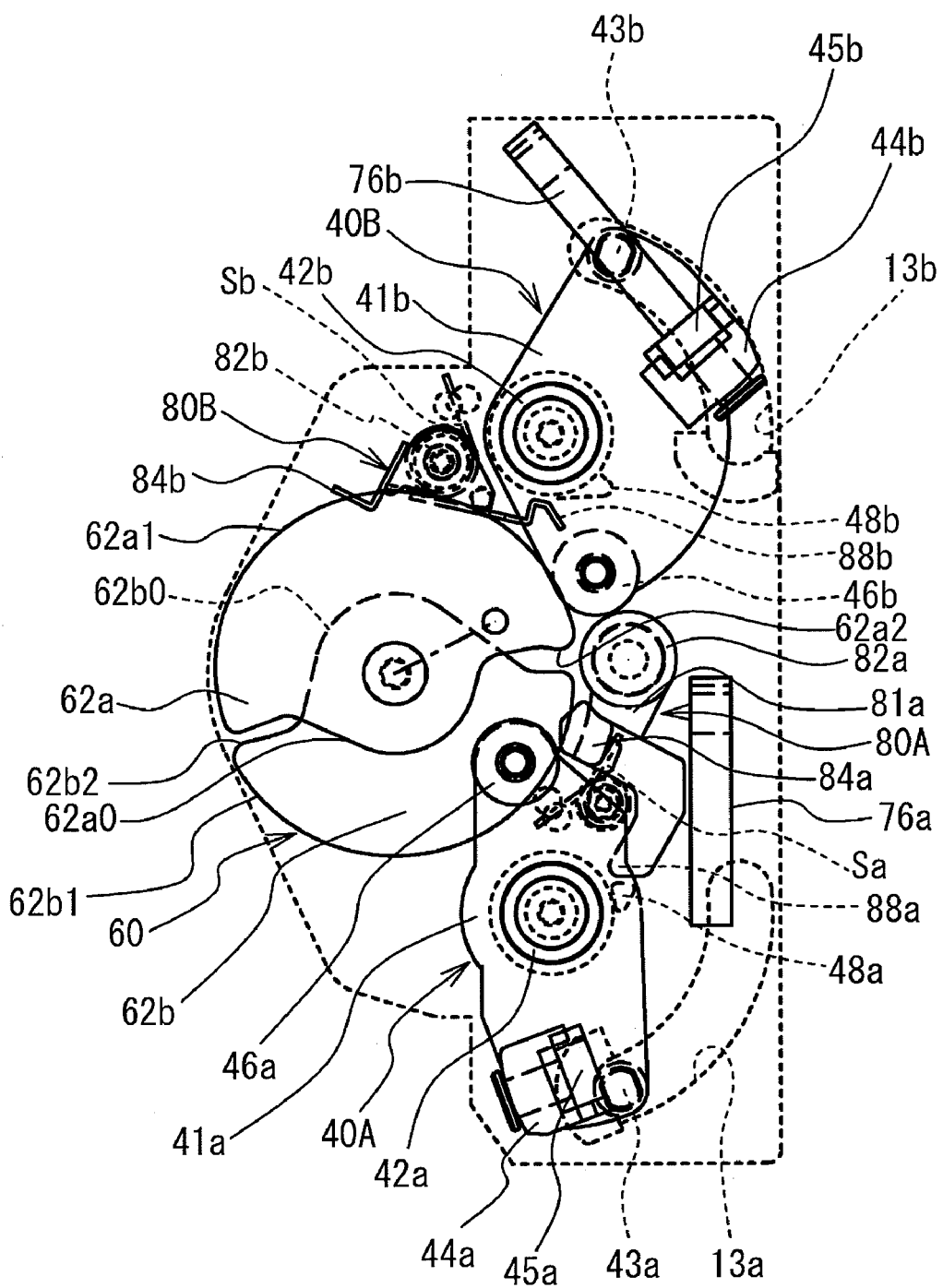
FIG. 4 is an explanatory view of an operation of the focal plane shutter.
Figure 5:
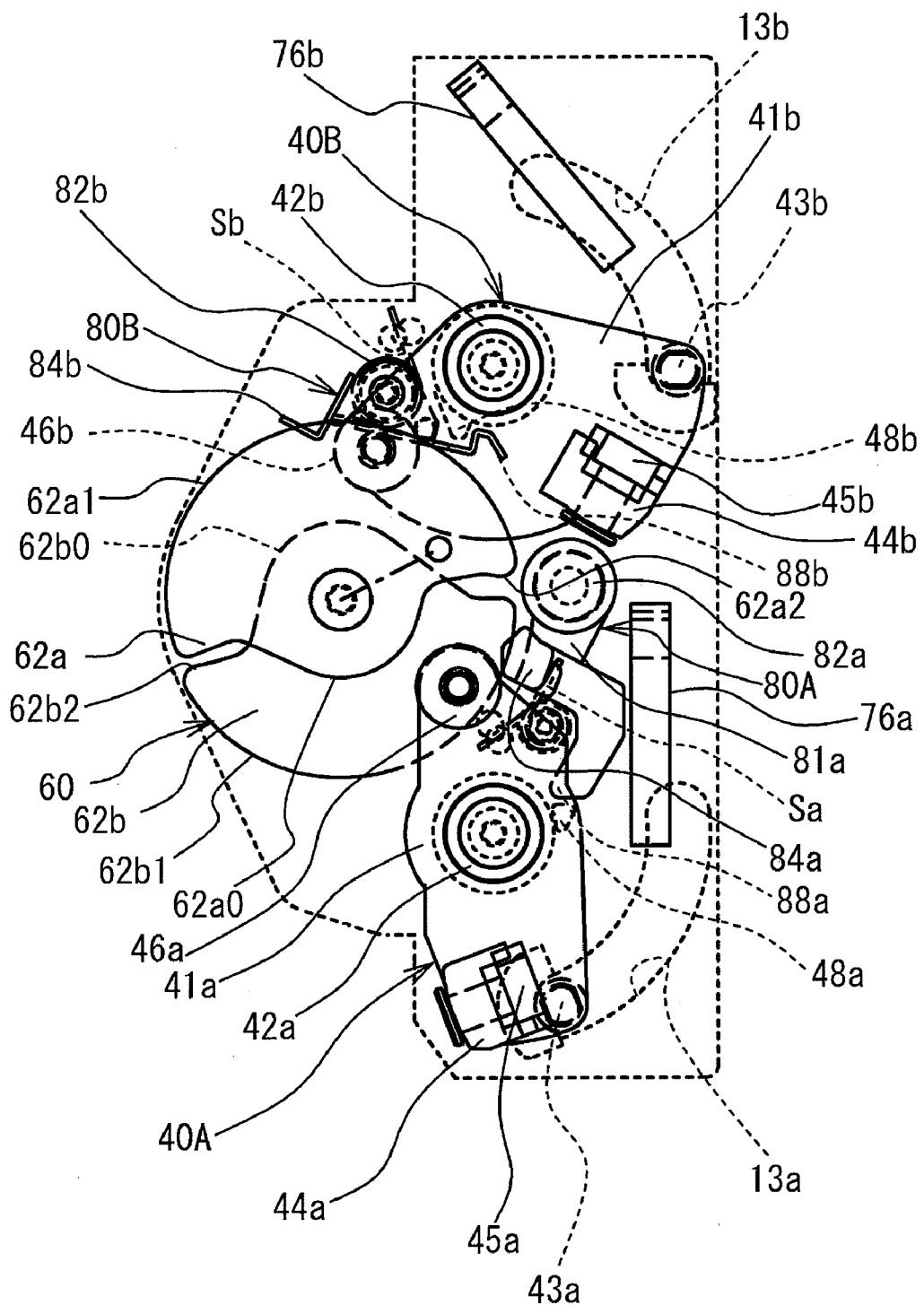
FIG. 5 is an explanatory view of the operation of the focal plane shutter.

Next, an operation of the focal plane shutter will be described with reference to FIGS. 2, 4, and 5. In shooting, a release button of the camera is pushed to energize coils of the electromagnets 70A and 70B in the state illustrated in FIG. 2, whereby the iron piece of the drive lever 40A is adsorbed to the electromagnet 70A and the iron piece of the drive lever 40B is adsorbed to the electromagnet 70B. In the state illustrated in FIG. 2, the drive cams 62a and 62b respectively abut the rollers 46a and 46b.

After that, the set member 60 rotates clockwise from the state illustrated in FIG. 2. When the set member 60 rotates clockwise, the projection surface 62a1 of the drive cam 62a moves to a position receding from a traveling trajectory of the roller 46a and moves away from the roller 46a. The projection surface 62b1 of the drive cam 62b moves to a position receding from a traveling trajectory of the roller 46b and moves away from the roller 46b. Herein, the energization of the electromagnet 70A is cut, thereby swinging the drive lever 40A clockwise by the biasing force of the spring 54A. The drive lever 40A moves from the start position to the terminal position. The leading blades 20A closing the opening 11 move away from the opening 11, and then the opening 11 is in a fully opened state. FIG. 4 illustrates an exposed state.

Further, the energization of the coil of the electromagnet 70B is cut after a predetermined period, and then the drive lever 40B is swung by the biasing force of the spring 54B. The drive lever 40B moves from the start position to the terminal position. Therefore, the opining 11 in the fully opened state is closed by the trailing blades 20B. FIG. 5 illustrates a state just after the exposure operation is finished. In such a way, one cycle of shooting is finished.

The brake member 80A will be described. When the drive lever 40A moves from the start position to the terminal position, the drive pin 43a might abut the terminal end portion of the escape slot 13a and then bound. The brake member 80A has a function for reducing the speed of the drive lever 40A and preventing the drive lever 40A from bounding. In the initial state illustrated in FIG. 2, FIG. 2 illustrates the state where the pushed portion 84a of the brake member 80A is pushed by the drive cam 62a and then the pushed portion 84a is rotated counterclockwise. That is, FIG. 2 illustrates the state where the brake member 80A is rotated counterclockwise against the biasing force of the spring Sa. Likewise, FIG. 2 illustrates the state where the pushed portion 84b of the brake member 80B is pushed by the drive cam 62b and then the brake member 80B is rotated clockwise. That is, FIG. 2 illustrates the state where the brake member 80B is rotated clockwise against the biasing force of the spring Sb.

When the set member 60 rotates clockwise from the state illustrated in FIG. 2, the projection surface 62a1 of the drive cam 62a moves away from the pushed portion 84a of the brake member 80A, and then the brake member 80A is slightly rotated clockwise by the biasing force of the spring Sa. Therefore, the abutted portion 88a of the brake member 80A is positioned on the trajectory of the abutting portion 48a. The set member 60 further rotates clockwise afterward, and the projection surface 62a1 of the drive cam 62a moves away from the roller 46a, as illustrated in FIG. 4. Herein, the energization of the coil of the electromagnet 70A is cut and then the drive lever 40A held at the start position is rotated clockwise by the biasing force of the spring 54A, whereby the abutting portion 48a abuts the abutted portion 88a and then the brake member 80A is rotated counterclockwise against the biasing force of the spring Sa. When the abutting portion 48a passes through the abutted portion 88a, the brake member 80A is pushed and returned clockwise by the biasing force of the spring Sa. This reduces the rotational speed of the drive lever 40A. When the abutting portion 48a passes through the abutted portion 88a, the abutted portion 88a rotates clockwise again to abut the abutting portion 48a with the abutted portion 88a located behind the abutting portion 48a. In other words, the abutted portion 88a prevents the movement of the drive lever 40A not to move the drive lever 40A toward the start position, that is, not to rotate counterclockwise. This prevents the drive lever 40A from bounding at the terminal position. The brake member 80A is a leading-blades brake member for reducing the speed of the drive lever 40A and preventing the drive lever 40A from bounding.

The abutted portion 88b of the brake member 80B and the abutting portion 48b of the drive lever 40B have the same functions. When the set member 60 rotates clockwise from the state illustrated in FIG. 2, the projection surface 62b1 of the drive cam 62b moves away from the pushed portion 84b of the brake member 80B, and then the brake member 80B is slightly rotated counterclockwise by the biasing force of the spring Sb. Therefore, the abutted portion 88b of the brake member 80B is positioned on the trajectory of the abutting portion 48b. The set member 60 further rotates clockwise afterward, the projection surface 62b1 of the drive cam 62b moves away from the roller 46b as illustrated in FIG. 4. Herein, the energization of the electromagnet 70B is cut, thereby rotating the drive lever 40B clockwise by the spring 54B. In response to this, the abutting portion 48b abuts the abutted portion 88b, and the brake member 80B is rotated clockwise against the biasing force of the spring Sb. When the abutting portion 48b passes through the abutted portion 88b, the brake member 80B is pushed and returned counterclockwise again by the biasing force of the spring Sb. This reduces the rotational speed of the drive lever 40B. When the abutting portion 48b passes through the abutted portion 88b, the abutted portion 88b abuts the abutting portion 48b with the abutted portion 88b located behind the abutting portion 48b, such that the drive lever 40B does not bound at the terminal position as illustrated in FIG. 5. In other words, the abutted portion 88b prevents the movement of the drive lever 40B not to move the drive lever 40B toward the start position, that is, not to rotate counterclockwise. This prevents the drive lever 40B from bounding at the terminal position. The brake member 80B is a trailing-blades brake member for reducing the speed of the drive lever 40B and preventing the drive lever 40B from bounding.

Figure 6:
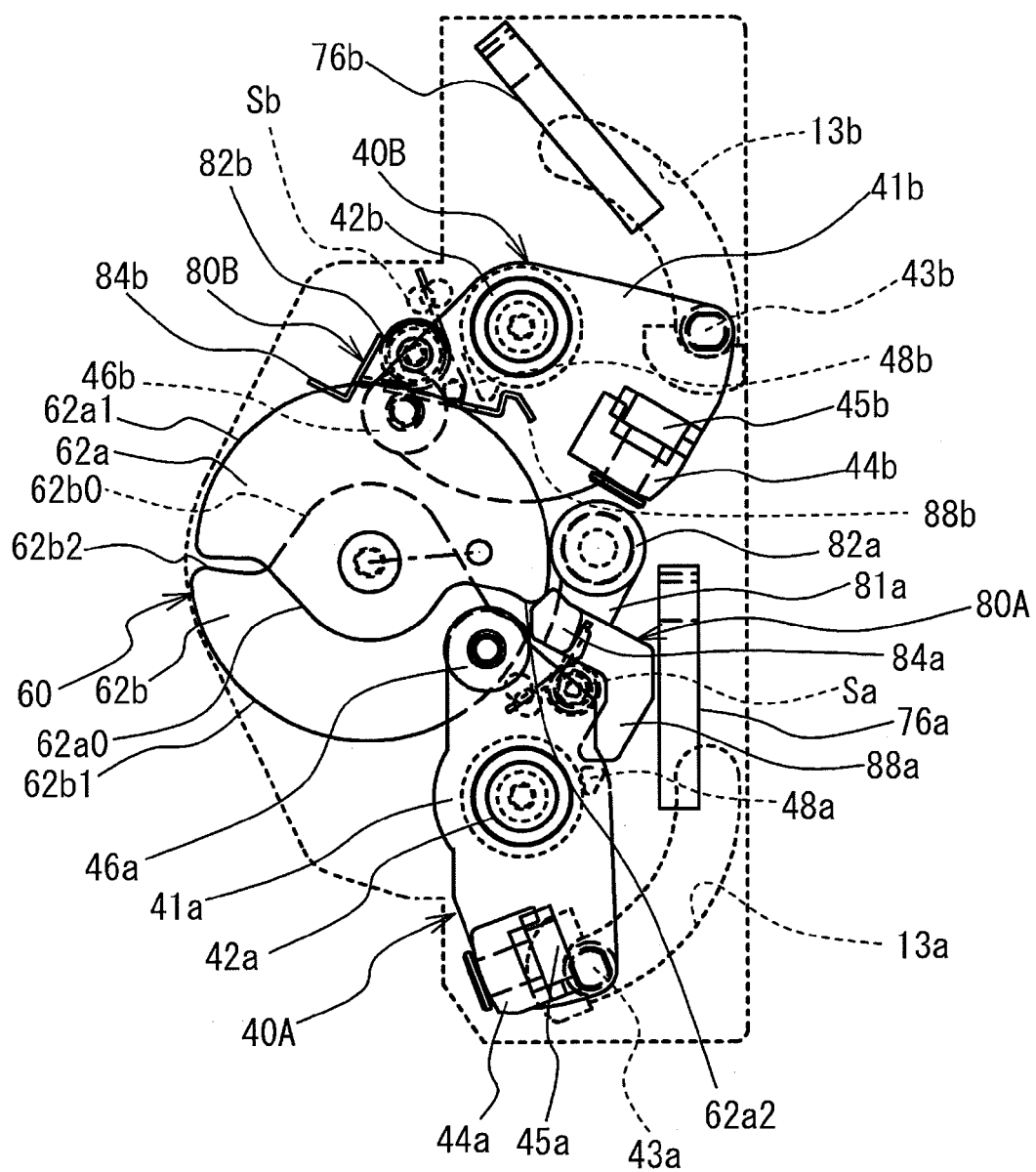
FIG. 6 is an explanatory view of shifting to an initial state.
Figure 7:
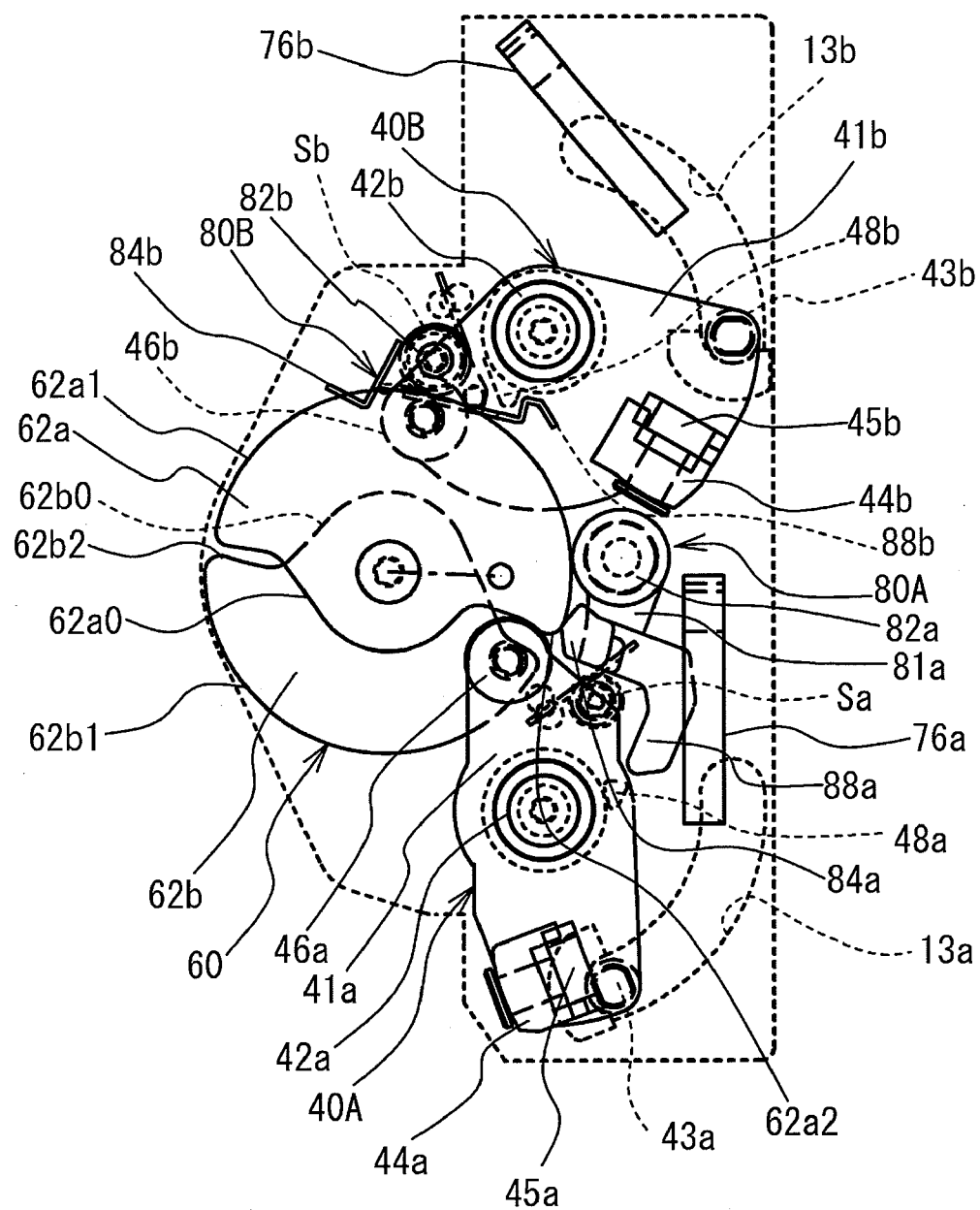
FIG. 7 is an explanatory view of shifting to the initial state.
Figure 8:
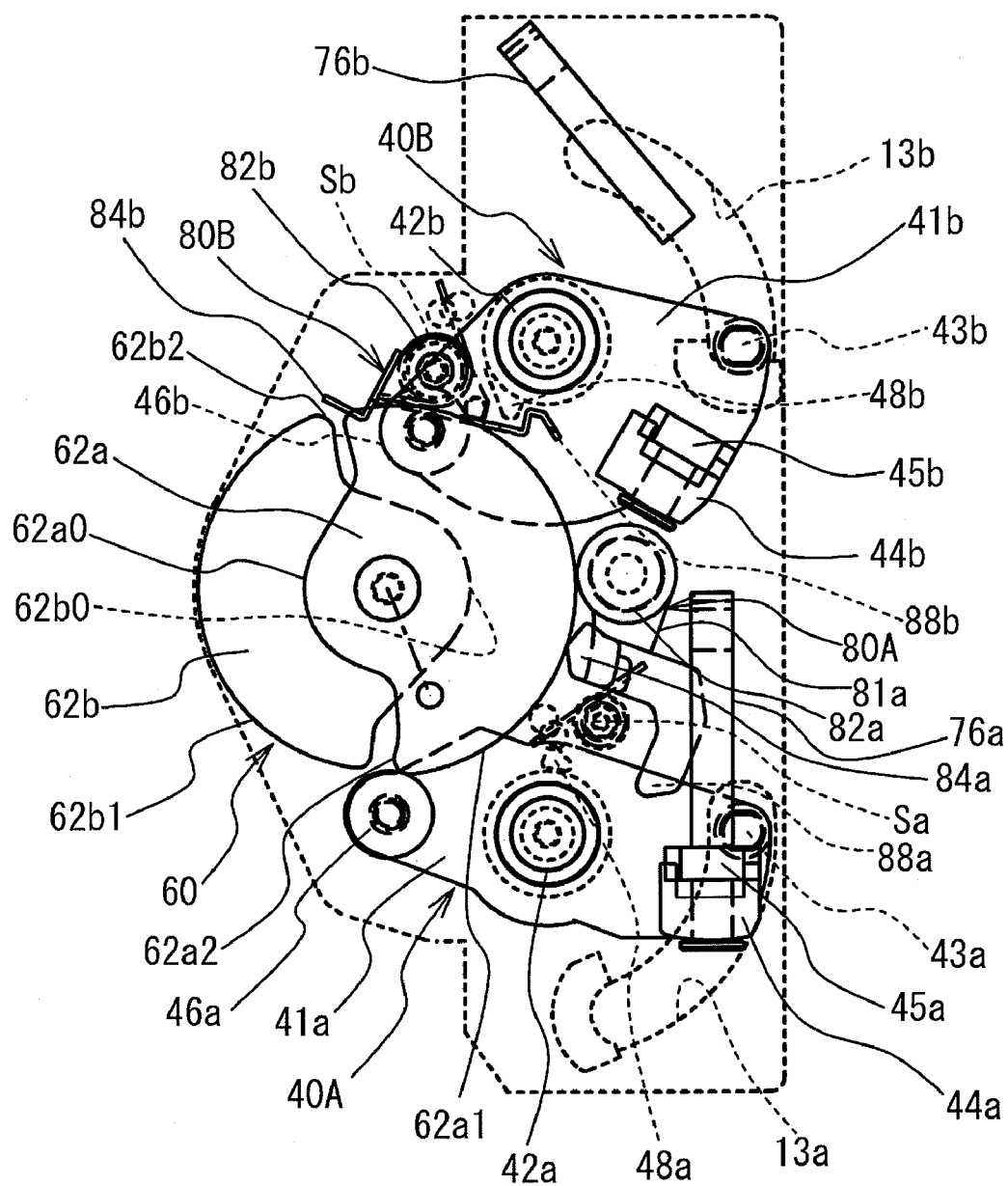
FIG. 8 is an explanatory view of shifting to the initial state.

Shifting to the initial state will be described with reference to FIGS. 6 to 11. When the set member 60 rotates clockwise from the state illustrated in FIG. 5, the operation surface 62a2 of the drive cam 62a abuts the pushed portion 84a of the brake member 80A as illustrated in FIG. 6. When the set member 60 further rotates clockwise, the brake member 80A is rotated counterclockwise as illustrated in FIG. 7, and then the abutted portion 88a moves away from the abutting portion 48a. Therefore, the drive lever 40A is permitted to move from the terminal position to the start position. When the set member 60 further rotates clockwise, the operation surface 62a2 of the drive cam 62a abuts the roller 46a to rotate the drive lever 40A counterclockwise, and then the drive lever 40A is positioned at the start position.

Figure 9:
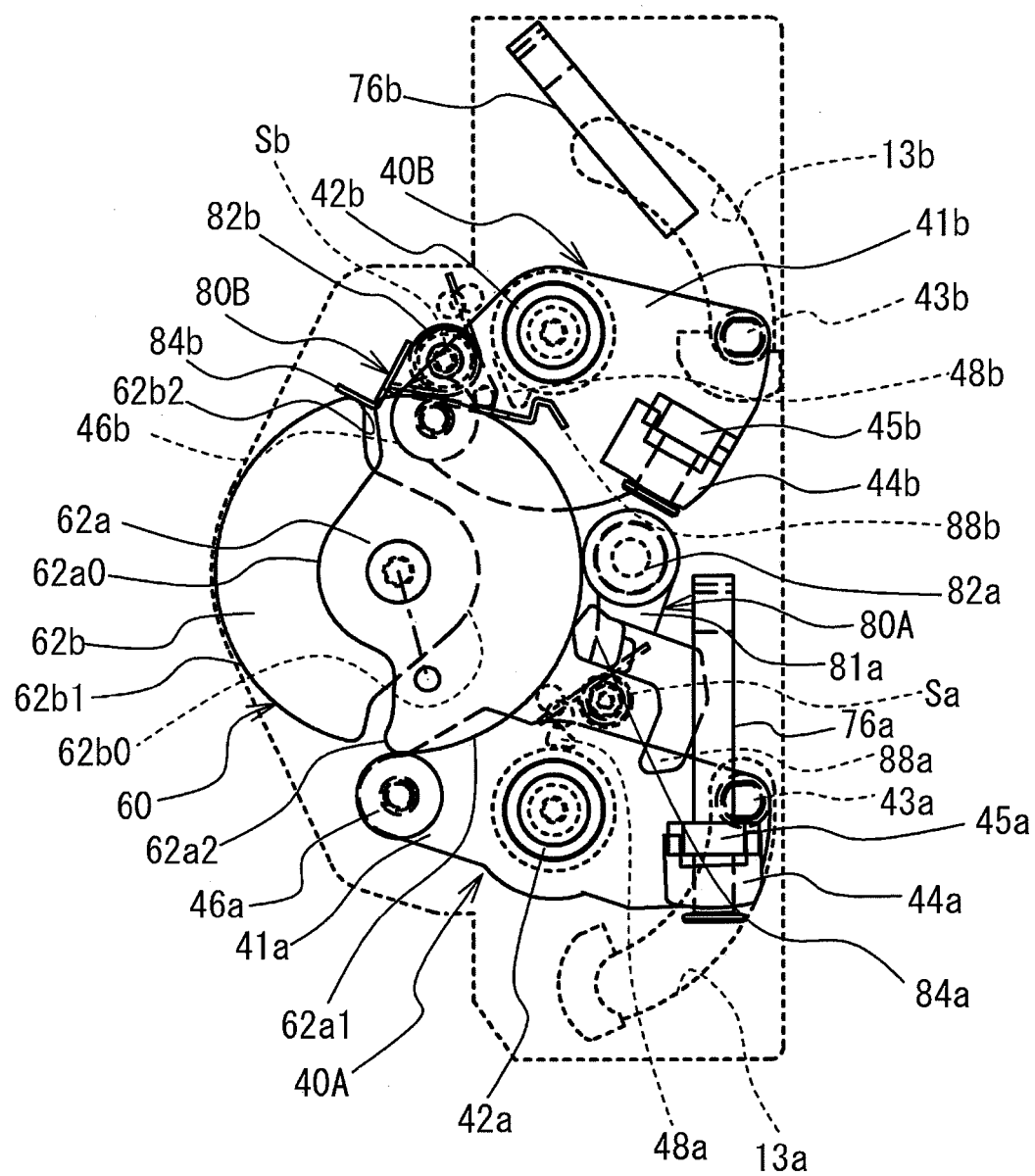
FIG. 9 is an explanatory view of shifting to the initial state.
Figure 10:
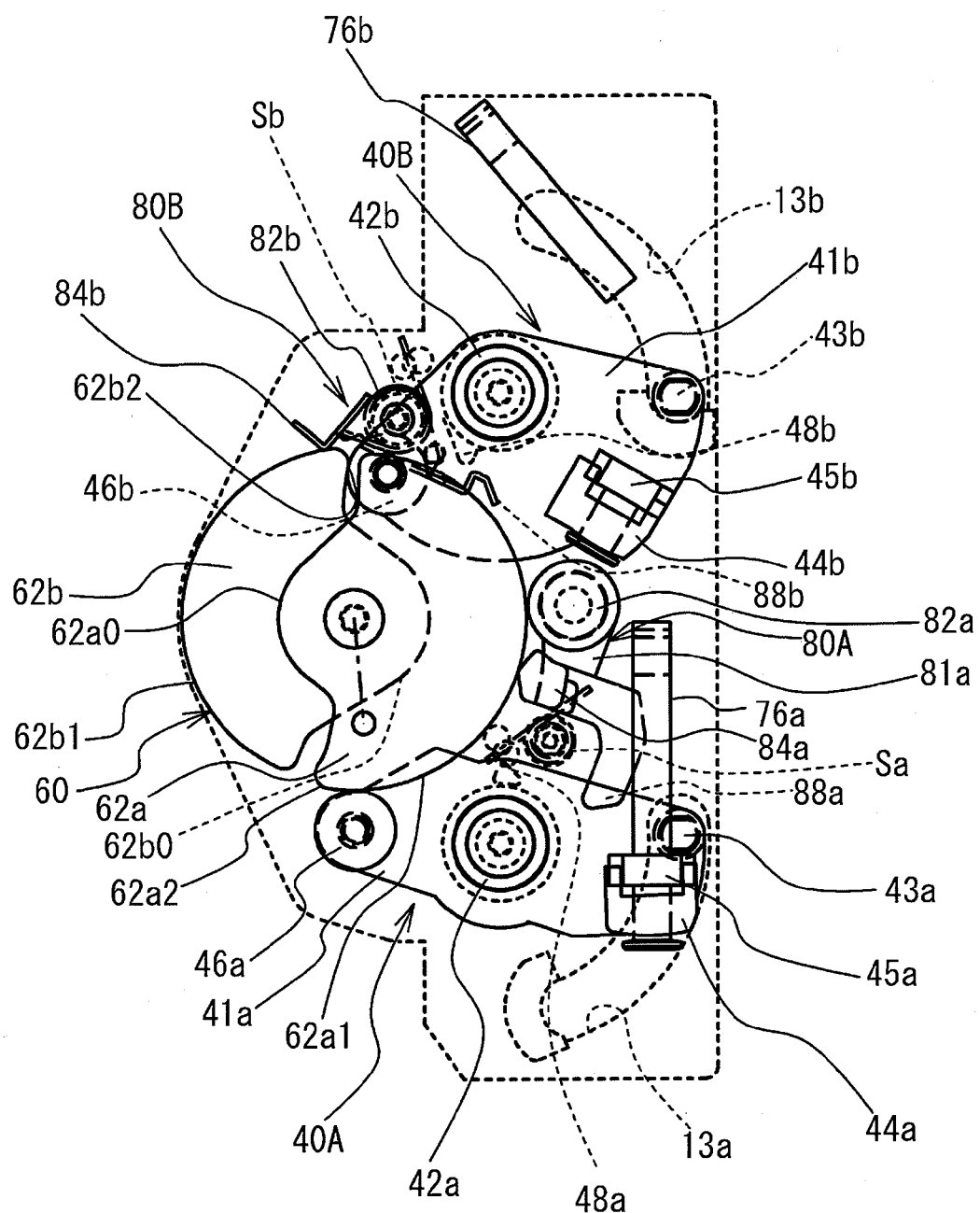
FIG. 10 is an explanatory view of shifting to the initial state.
Figure 11:
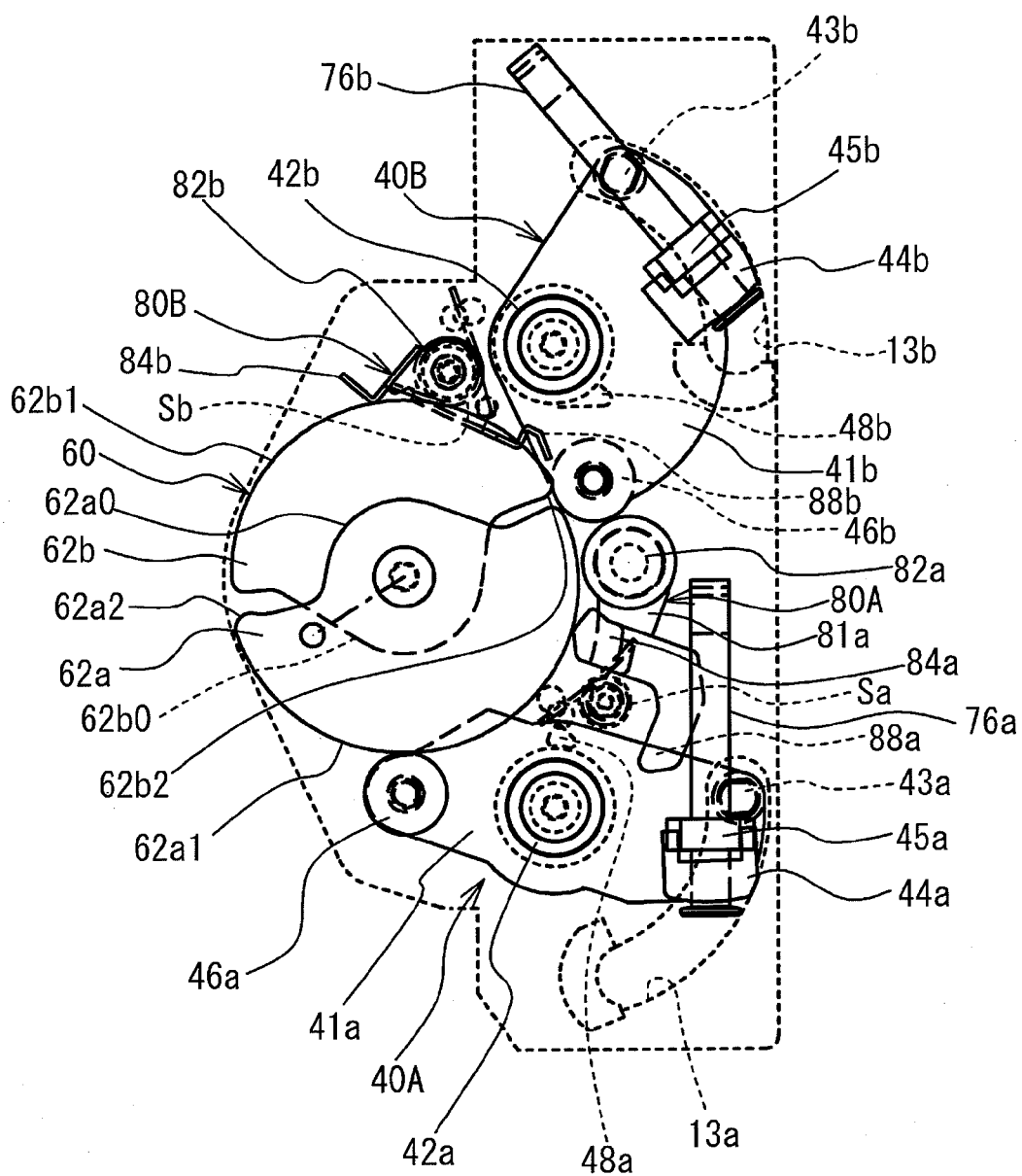
FIG. 11 is an explanatory view of shifting to the initial state.

When the set member 60 further rotates clockwise, the operation surface 62b2 of the drive cam 62b abuts the pushed portion 84b of the brake member 80B as illustrated in FIG. 9. When the set member 60 rotates, the brake member 80B rotates clockwise and then the abutted portion 88b moves away from the abutting portion 48b. Therefore, the drive lever 40B is permitted to move from the terminal position to the start position. When the set member 60 further rotates clockwise, the operation surface 62*b*2 of the drive cam 62*b* abuts the roller 46*b* to rotate the drive lever 40B counterclockwise, and then the drive lever 40B is positioned at the start position as illustrated in FIG. 11. At this time, the drive lever 40A is held at the start position by the drive cam 62*a* of the set member 60, as mentioned above. When the electromagnets 70A and 70B are energized in this state, the iron pieces 45*a* and 45*b* are respectively adsorbed to the iron cores 76*a* and 76*b*.

In such a manner, the drive lever 40A and drive lever 40B are positioned at the start positions from the terminal positions. As mentioned above, the drive cam 62*a* abuts the brake member 80A to move the brake member 80A away from the drive lever 40A while the set member 60 is rotating clockwise, and then the drive cam 62*a* abuts the drive lever 40A to move the drive lever 40A to the start position. In such a manner, the single drive cam 62*a* causes the brake member 80A to recede and the drive lever 40A to move to the start position. The drive cam 62*b* has the same functions.

Accordingly, the structure of the set member 60 according to the present embodiment is simplified and reduced in size, as compared with cases where the set member is provided with a drive portion for moving the brake member 80A away from the drive lever 40A and a drive portion for moving the drive lever 40A to the start position and the drive portions are separately provided. This reduces the size of the focal plane shutter.

For example, in cases where the set member rotating in only one direction is provided with a drive cam for moving the brake member 80A away from the drive lever 40A and a drive cam for moving the drive lever 40A and the drive cams are separately provided, both drive cams have to be arranged in the optical axis direction. This is because the drive portion for causing the brake member 80A to recede is avoided from abutting the drive lever 40A while the set member is rotating in one direction. Further, this is because the drive portion for moving the drive lever 40A is avoided from abutting the brake member 80A. Furthermore, the set member has to be provided with a drive portion for moving the brake member 80B away from the drive lever 40B and a drive portion for moving the drive lever 40B. Thus, the set member has to be provided with four drive cams arranged in the optical axis direction, and the set member is increased in size in the optical axis direction.

In the present embodiment, two drive cams 62*a* and 62*b* cause the brake members 80A and 80B to recede and causes the drive lever 40A and the drive lever 40B to move. This reduces the set member set member 60 in size, in particular, in the optical path direction. Thus, the focal plane shutter according to the present embodiment is reduced in thickness in the optical axis direction.

While the exemplary embodiments of the present invention have been illustrated in detail, the present invention is not limited to the above-mentioned embodiments, and other embodiments, variations and modifications may be made without departing from the scope of the present invention.

The focal plane shutter according to the present embodiment can be employed in an optical apparatus such as a still camera or a digital camera.

Although each blade configuring the leading blades and the trailing blades made of a synthetic resin has been described in the above embodiment, each blade may be made of a metal.

Finally, several aspects of the present invention are summarized as follows.

According to an aspect of the present invention, there is provided a focal plane shutter including: a board including an opening; blades capable of opening and closing the opening; a drive member movable between a start position and a terminal position, biased toward the terminal position, and driving the blades; a brake member supported to abut and move away from the drive member positioned at the terminal position, and biased to abut the drive member positioned at the terminal position; and a set member rotatable in only one direction, and moving the drive member from the terminal position to the start position; wherein the set member includes a drive portion abutting the brake member to move the brake member away from the drive member and then abutting the drive member to move the drive member toward the start position.

Therefore, the single drive portion provided in the set member moves the brake member away from the drive member positioned at the terminal position, and moves the drive member to the start position. It is thus unnecessary to separately provide a portion for moving the brake member away from the drive member and a portion for moving the drive member to the start position. This can reduce the size of the set member, and can also reduce the size of the focal plane shutter.

In the above configuration, a iron piece provided in the drive member and an electromagnet capable of adsorbing the iron piece of the drive member positioned at the start position may be included, the drive portion may move away from the brake member and the drive member, thereby permitting the drive member to move from the start position to the terminal position based on energization of the electromagnet that is cut.

Therefore, the blades are moved by the single drive portion, thereby reducing the size of the focal plane shutter.

According to another aspect of the present invention, there is provided an optical apparatus including the above focal plane shutter.

What is claimed is:

1. A focal plane shutter comprising:
    a board including an opening;
    blades capable of opening and closing the opening;
    a drive member movable between a start position and a terminal position, biased toward the terminal position, and driving the blades;
    a brake member supported to abut and move away from the drive member positioned at the terminal position, and biased to abut the drive member positioned at the terminal position; and
    a set member rotatable in only one direction, and moving the drive member from the terminal position to the start position,
    wherein the set member includes a drive portion abutting the brake member to move the brake member away from the drive member and then abutting the drive member to move the drive member toward the start position.

2. The focal plane shutter of claim 1, further comprising:
    a iron piece provided in the drive member; and
    an electromagnet capable of adsorbing the iron piece of the drive member positioned at the start position,
    wherein the drive portion moves away from the brake member and the drive member, thereby permitting the drive member to move from the start position to the terminal position based on energization of the electromagnet that is cut.

3. The focal plane shutter of claim 1, wherein
    the drive portion is a drive cam including:
        a projection surface projected radially outward from a rotational center of the set member;

a receding surface receded radially inward as compared with the projection surface; and an operation surface arranged between the projection surface and the receding surface, the projection surface holds the brake member in a receding position where the brake member recedes from the drive member, and holds the drive member in the start position, the receding surface permits the brake member and the drive member to move without abutting the brake member or the drive member, and the operation surface moves the brake member away from the drive member and moves the drive member from the terminal position to the start position.

4. The focal plane shutter of claim 1, wherein the blades include leading blades and trailing blades, the drive member includes a leading-blades drive member and a trailing-blades drive member respectively driving the leading blades and the trailing blades, the brake member includes a leading-blades brake member and a trailing-blades brake member capable of respectively abutting and moving away from the leading-blades drive member and the trailing-blades drive member, the drive portion includes a leading-blades drive portion and a trailing-blades drive portion, the leading-blades drive portion abuts the leading-blades brake member to move the leading-blades brake member away from the leading-blades drive member and then abuts the leading-blades drive member to move the leading-blades drive member to the start position, and the trailing-blades drive portion abuts the trailing-blades brake member to move the trailing-blades brake member away from the trailing-blades drive member and then abuts the trailing-blades drive member to move the trailing-blades drive member to the start position.

5. An optical apparatus comprising a focal plane shutter, the focal plane shutter including:

a board including an opening;

blades capable of opening and closing the opening;

a drive member movable between a start position and a terminal position, biased toward the terminal position, and driving the blades;

a brake member supported to abut and move away from the drive member positioned at the terminal position, and biased to abut the drive member positioned at the terminal position; and a set member rotatable in only one direction, and moving the drive member from the terminal position to the start position, wherein the set member includes a drive portion abutting the brake member to move the brake member away from the drive member and then abutting the drive member to move the drive member toward the start position.

* * * * *